United States Patent
Marastoni et al.

(10) Patent No.: US 9,833,940 B2
(45) Date of Patent: Dec. 5, 2017

(54) SYSTEM FOR FEEDING PREFORMS

(71) Applicant: SACMI IMOLA S.C., Imola (IT)

(72) Inventors: Daniele Marastoni, San Giovanni In Persiceto (IT); Fabio Carnevali, Bologna (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 15/320,311

(22) PCT Filed: Jun. 17, 2015

(86) PCT No.: PCT/EP2015/063550
§ 371 (c)(1),
(2) Date: Dec. 19, 2016

(87) PCT Pub. No.: WO2015/193351
PCT Pub. Date: Dec. 23, 2015

(65) Prior Publication Data
US 2017/0157833 A1 Jun. 8, 2017

(30) Foreign Application Priority Data

Jun. 18, 2014 (IT) .............................. VR2014A0168

(51) Int. Cl.
*B65G 47/24* (2006.01)
*B29C 49/42* (2006.01)
(Continued)

(52) U.S. Cl.
CPC ........ *B29C 49/4205* (2013.01); *B65G 47/525* (2013.01); *B65G 47/766* (2013.01); *B29C 2049/4231* (2013.01); *B29L 2031/712* (2013.01)

(58) Field of Classification Search
CPC ........ B65G 39/02; B65G 47/24; B65G 47/14; B65G 47/256
(Continued)

(56) References Cited

U.S. PATENT DOCUMENTS 2,936,869 A * 5/1960 Howard ............... B65G 47/256
193/46
3,774,806 A * 11/1973 Swart ................. B65G 47/1428
198/389
(Continued)

FOREIGN PATENT DOCUMENTS

EP 2357146 A1 8/2011
WO 0236466 A1 5/2002
(Continued)

OTHER PUBLICATIONS

International Search Report dated Aug. 25, 2015 re: Application No. PCT/EP2015/063550; pp. 1-3; citing: EP 1 697 238 A1, EP 2 357 146 A1, WO 2013/185930 A1 and WO 2010/006461 A.
(Continued)

*Primary Examiner* — James R Bidwell
(74) *Attorney, Agent, or Firm* — Cantor Colburn LLP

(57) ABSTRACT

A system for feeding preforms to a container blow-molding machine includes a sorting and alignment device fed with randomly arranged preforms and parallel alignment rollers that rotate about their respective axes and arrange the preforms in conveyance tracks inclined with respect to the horizontal. The system includes elements for removing the incorrectly positioned preforms, which are individually laid flat and arrive from the alignment rollers on the conveyance tracks and are oriented parallel to the longitudinal advancement direction. The removal components include an upper guide having a flow control portion arranged at least in one active blocking position thereof, above the end of the alignment rollers proximate to the conveyance tracks dis-
(Continued)

tanced from the alignment rollers to allow passage below the flow control portion of the correctly oriented preforms and block the longitudinal end.

12 Claims, 9 Drawing Sheets

(51) Int. Cl.
  *B65G 47/52* (2006.01)
  *B65G 47/76* (2006.01)
  *B29L 31/00* (2006.01)

(58) Field of Classification Search
  USPC .......................................... 198/389, 392, 406
  See application file for complete search history.

(56) References Cited

U.S. PATENT DOCUMENTS

| | | | | |
|---|---|---|---|---|
| 4,162,012 A | * | 7/1979 | Kupper | B07B 13/05 209/662 |
| 4,223,778 A | * | 9/1980 | Kontz | B29C 49/4205 198/389 |
| 4,549,662 A | * | 10/1985 | Schoenig, Jr. | B07C 5/36 198/419.1 |
| 4,717,026 A | * | 1/1988 | Fischer | B07C 5/02 198/451 |
| 5,186,307 A | * | 2/1993 | Doudement | B07C 5/07 198/453 |
| 8,783,469 B2 | * | 7/2014 | Beutl | B29C 49/4205 209/522 |
| 8,813,944 B2 | * | 8/2014 | Tanner | B65G 47/256 198/389 |
| 2010/0255142 A1 | * | 10/2010 | Brown | B29C 49/4205 198/389 |
| 2011/0120833 A1 | * | 5/2011 | Tanner | B29C 49/4205 198/444 |

FOREIGN PATENT DOCUMENTS

| | | |
|---|---|---|
| WO | 2005070793 A1 | 8/2005 |
| WO | 2010006461 A1 | 1/2010 |
| WO | 2013185930 A1 | 12/2013 |

OTHER PUBLICATIONS

Written Opinion dated Aug. 25, 2015 re: Application No. PCT/EP2015/063550; pp. 1-4; citing: EP 1 697 238 A1, EP 2 357 146 A1, WO 2013/185930 A1 and WO 2010/006461 A.

* cited by examiner

SYSTEM FOR FEEDING PREFORMS

CROSS-REFERENCE TO RELATED APPLICATIONS

This application is related to, and claims the benefit of Italian Patent Application No. VR2014A000168, filed on Jun. 18, 2014, the contents of which are herein incorporated by reference in its entirety.

TECHNICAL FIELD

The present disclosure relates to a system for feeding preforms.

BACKGROUND

Systems are known for feeding preforms to machines such as, for example, blow-molding machines, and in such systems the preforms are allocated at a containment hopper from which they are picked up by elevator trays which, in turn, feed them to a feeder device which usually comprises two alignment rollers which are inclined with respect to the horizontal and are substantially mutually parallel.

The two rollers are made to rotate in mutually opposite directions and are mutually spaced apart so as to leave an interspace between the two rollers which is slightly larger than the transverse size of the body of the preforms.

Such interspace is still smaller than the size of the support flange arranged at the base of the neck of the preform.

Such systems are configured so that, under the effect of gravity, the preforms are made to arrange themselves between the two rollers, so that the body of the preform extends, downwardly, into the interspace defined between the rollers and so that the corresponding flange is resting on the rollers: the rotary motion of the rollers and their inclination tend to bring the preforms, one after the other, into the position described above.

Downstream of the rollers, the preforms are brought to a conveyor guide which is constituted by two conveyance rails, which are designed to feed the preforms to a machine, for example to a blow-molding machine.

Since the preforms are unloaded in a disorderly manner onto the alignment rollers, some of them will arrive at the conveyance rails without being arranged correctly.

This is the reason why known systems for feeding preforms comprise filtration means, for example constituted by brushes, the purpose of which is to eliminate such preforms from the rollers.

In order to improve, in conventional systems for feeding, the elimination of incorrectly positioned preforms, the document WO2002/036466 discloses the possibility of using, in order to eliminate the incorrectly arranged preforms, an expulsion wheel arranged above the rollers so as to discard the incorrectly positioned preforms and, specifically, preforms inserted one inside the other and vertically or preforms lying horizontally and above the correctly arranged preforms.

Such solution is however not fully satisfactory, in that it does not succeed in eliminating all types of incorrectly positioned preforms.

In fact, in some cases the preforms arrange themselves laid flat and oriented longitudinally, i.e. parallel to the axes of the rollers and of the conveyance rails.

In these cases, the preforms are not eliminated with conventional devices and, consequently, they are fed to the blow-molding machine, inevitably causing a shutdown of the machine and the necessity of manually removing the preform.

In order to try to solve such drawbacks, a solution has been devised, disclosed in EP1697238 B1 by Sidel, which comprises, in sequence along the longitudinal advancement direction of the preforms, a sorting and alignment device the upper end of which is fed with randomly arranged preforms and the lower end of which comprises at least two alignment rollers, which are substantially parallel and rotatable about the respective axes.

The two alignment rollers are designed to position the preforms in conveyance tracks, which are inclined with respect to the horizontal, in order to feed them to the blow-molding machine.

The system comprises, upstream of the blow-molding machine, filtration means for removing the incorrectly positioned preforms.

Such filtration means comprise, downstream of the alignment rollers, at least one selective removal device which is designed to remove the preforms laid flat individually, which arrive from the alignment rollers on the conveyance tracks and are oriented longitudinally and extend completely longitudinally on the conveyance tracks.

In this manner, the incorrectly aligned preforms are expelled by the alignment system (and recovered at another time), thus preventing a buildup of them on the alignment rollers and a consequent blockage of the machine.

In the solution disclosed and illustrated in EP1697238 B1, the unloading of the preforms occurs when these extend, in a longitudinal direction, wholly on the rails.

The unloading is ensured by the fact that a portion of the rails can move in order to allow, once the interruption in the advancement of the preforms toward the blow-molding machine has been detected, a widening of the interspace between the rails and the unloading of the incorrectly oriented preform (and of those arranged immediately upstream).

However, the solution proposed above does not appear to be devoid of drawbacks either.

In particular, it is necessary to structure the unloading rails so that a portion can be moved on command, with an evident increase of the construction complexity of the system.

Furthermore, in order to be certain that the incorrectly oriented preforms are unloaded, it is necessary that a considerable portion of rail be moveable and this entails, consequently, the unloading of a considerable number of preforms which are correctly aligned, as well.

The aim of the present disclosure is to eliminate, or at least to drastically reduce, the above mentioned drawbacks.

Within this aim, the disclosure provides a system for feeding preforms which makes it possible to unload the incorrectly oriented preforms in an extremely practical and effective manner.

The disclosure further provides a system for feeding preforms which can be implemented without having to intervene on the rails.

This aim and these and other advantages which will become better apparent hereinafter are achieved by providing a system for feeding preforms according to the appended independent claims.

BRIEF DESCRIPTION OF THE DRAWINGS

Further characteristics and advantages of the disclosure will become better apparent from the description of some preferred, but not exclusive, embodiments of a system for feeding preforms according to the disclosure, which are illustrate by way of non-limiting example in the accompanying drawings wherein:

FIG. 1a is an enlarged-scale side view of a preform;

DETAILED DESCRIPTION OF THE DRAWINGS

Figure 1:
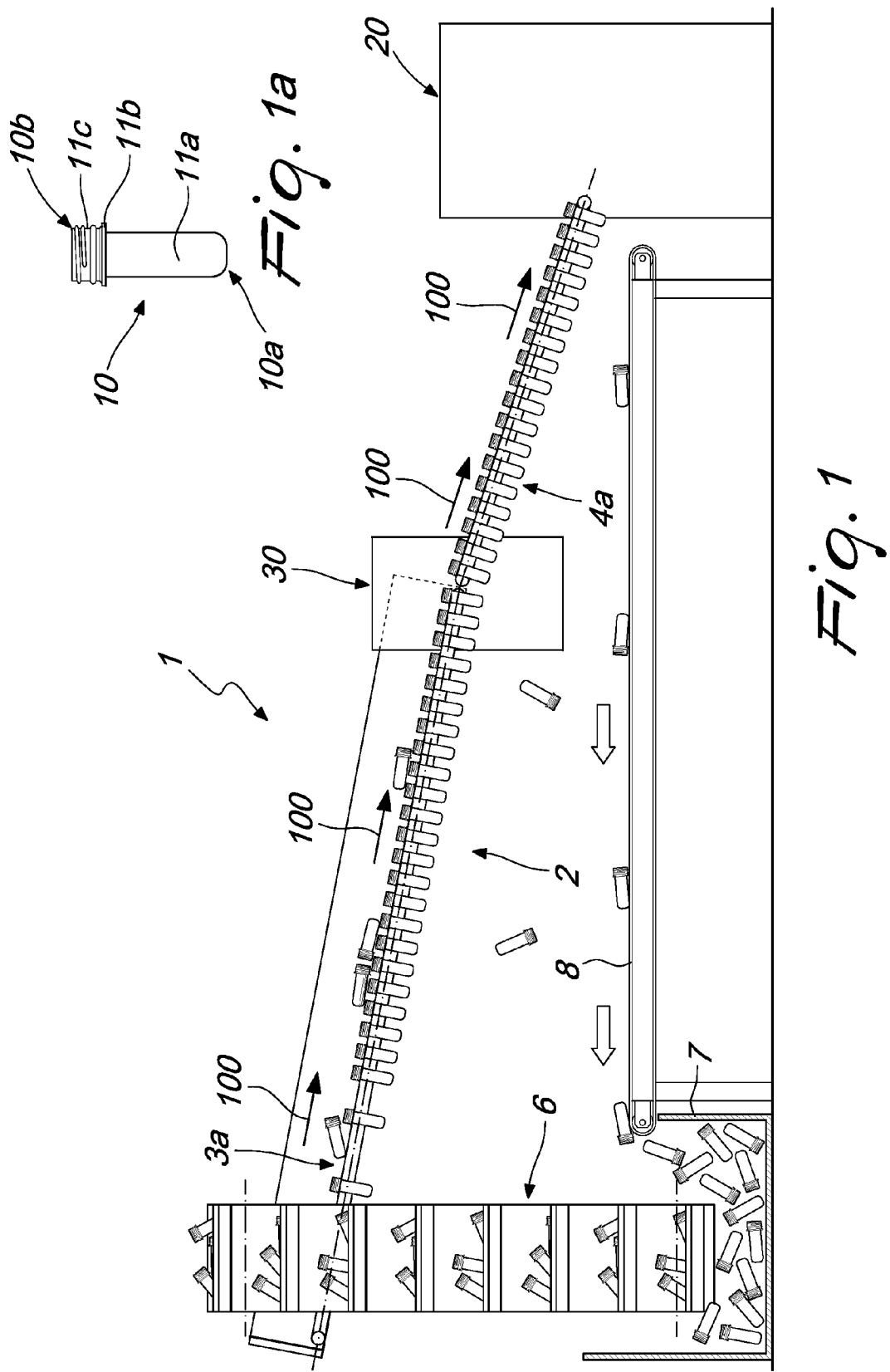
FIG. 1 is a schematic side elevation view of a system for feeding preforms.

The present disclosure relates to a system, generally designated with the reference numeral 1, for feeding preforms 10 to a machine 20 for blow-molding containers.

The system 1 comprises, in sequence along a longitudinal advancement direction, shown by the arrows designated with the reference numeral 100, of the preforms 10, at least one sorting and alignment device 2 which is fed with preforms 10 which are arranged at random.

The sorting and alignment device 2 comprises at least two alignment rollers, which are designated with the numerals 3a and 3b, and are substantially parallel and rotatable about the respective axes 101, 102.

The alignment rollers 3a and 3b are designed to position the preforms 10 in conveyance tracks 4a, 4b, which are inclined with respect to the horizontal, in order to feed them to the blow-molding machine 20.

Advantageously, the two alignment rollers 3a and 3b are made to rotate in mutually opposite directions and are mutually spaced apart so as to leave an interspace between them which is slightly larger than the transverse size of the body 11a of the preforms 10.

Such interspace is still smaller than the transverse dimension of the support flange 11b arranged at the base of the neck 11c of the preform 10.

Conveniently, the system 1 is configured so that, under the effect of gravity, the preforms 10 are made to arrange themselves between the two alignment rollers 3a and 3b, so that the body 11a of the preform 10 extends, downwardly, into the interspace defined between the alignment rollers 3a and 3b and so that the corresponding support flange 11b is resting on the alignment rollers 3a and 3b.

In particular, the rotary motion of the alignment rollers 3a, 3b and their inclination tend to bring the preforms 10, one after the other, into the correct position.

According to the present disclosure, the system 1 comprises means 30 for removing the incorrectly positioned preforms 10 and, in particular, of the preforms 10 that are individually laid flat and arriving from the alignment rollers 3a, 3b on the conveyance tracks 4a, 4b and which are oriented parallel to the longitudinal advancement direction 100.

In this discussion, the wording "incorrectly positioned preforms" is used to mean preforms that are individually laid flat and arriving from the alignment rollers 3a, 3b on the conveyance tracks 4a, 4b and which are oriented parallel to the longitudinal advancement direction 100.

Delving deeper into the details, the removal means 30 comprise an upper guide 31, which has at least one flow control portion, designated with the reference numeral 31a, which is arranged, at least in one active blocking position thereof, above the end of the alignment rollers 3a, 3b which is proximate to the conveyance tracks 4a, 4b.

Conveniently, the flow control portion 31a extends parallel to the longitudinal advancement direction 100.

Figure 2:
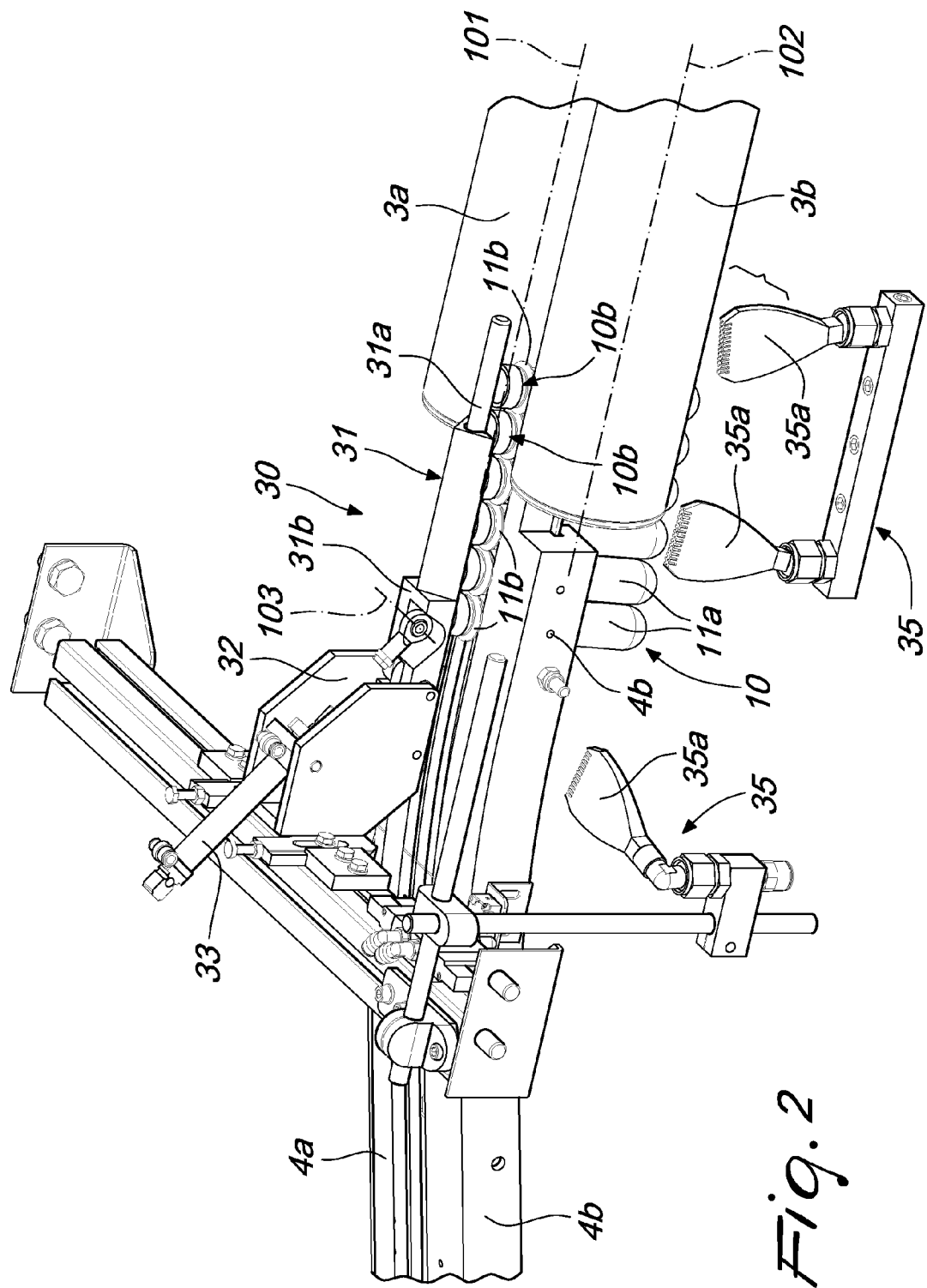
FIG. 2 is a perspective view of the region straddling the alignment rollers and the conveyance rails during a step of advancement of correctly oriented preforms.
Figure 3:
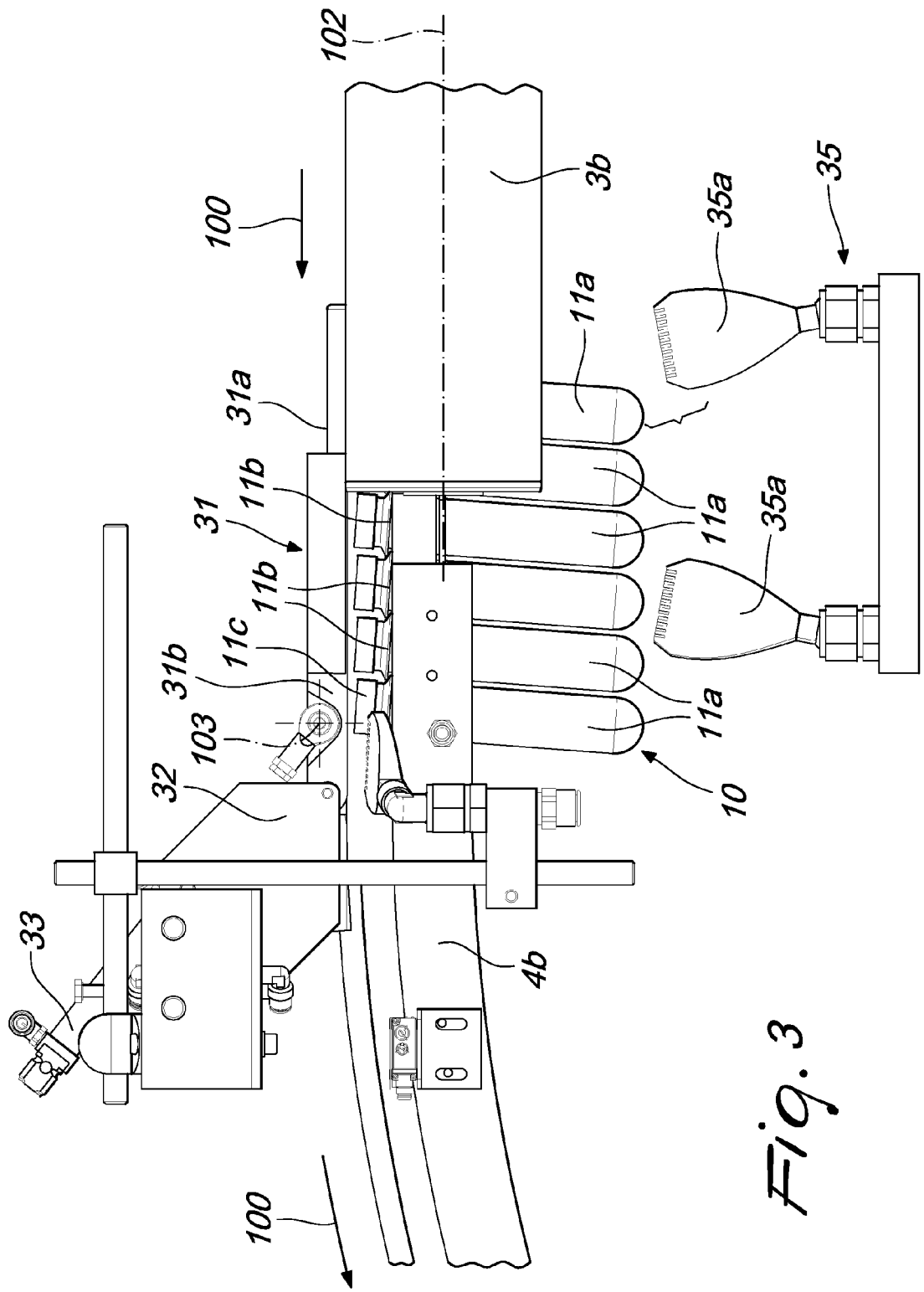
FIG. 3 is a side elevation view of the situation shown in the perspective view in FIG. 2.

The flow control portion 31a is arranged, at least in the active blocking position, at a distance from the alignment rollers 3a, 3b which is such as to allow the passage below the flow control portion 31a of the correctly oriented preforms 10 (as shown for example in FIGS. 2 and 3) but is such as to block the longitudinal end, which is arranged upstream with respect to the longitudinal advancement direction 100, of the incorrectly oriented preforms 10 when such incorrectly oriented preforms 10 straddle the alignment rollers 3a, 3b and the conveyance tracks 4a, 4b.

With reference to the figures, such longitudinal end arranged upstream comprises the end 10b at which the support flange 11b is defined.

The removal means 30 comprise, furthermore, means 35 of unloading the preform 10 which has the longitudinal end (for example the end designated with the reference numeral 10b) blocked by the flow control portion 31a.

Conveniently, the system 1 comprises control means which are associated functionally with means for detecting the flow of preforms 10 toward the machine 20 for blow-molding containers.

Figure 4:
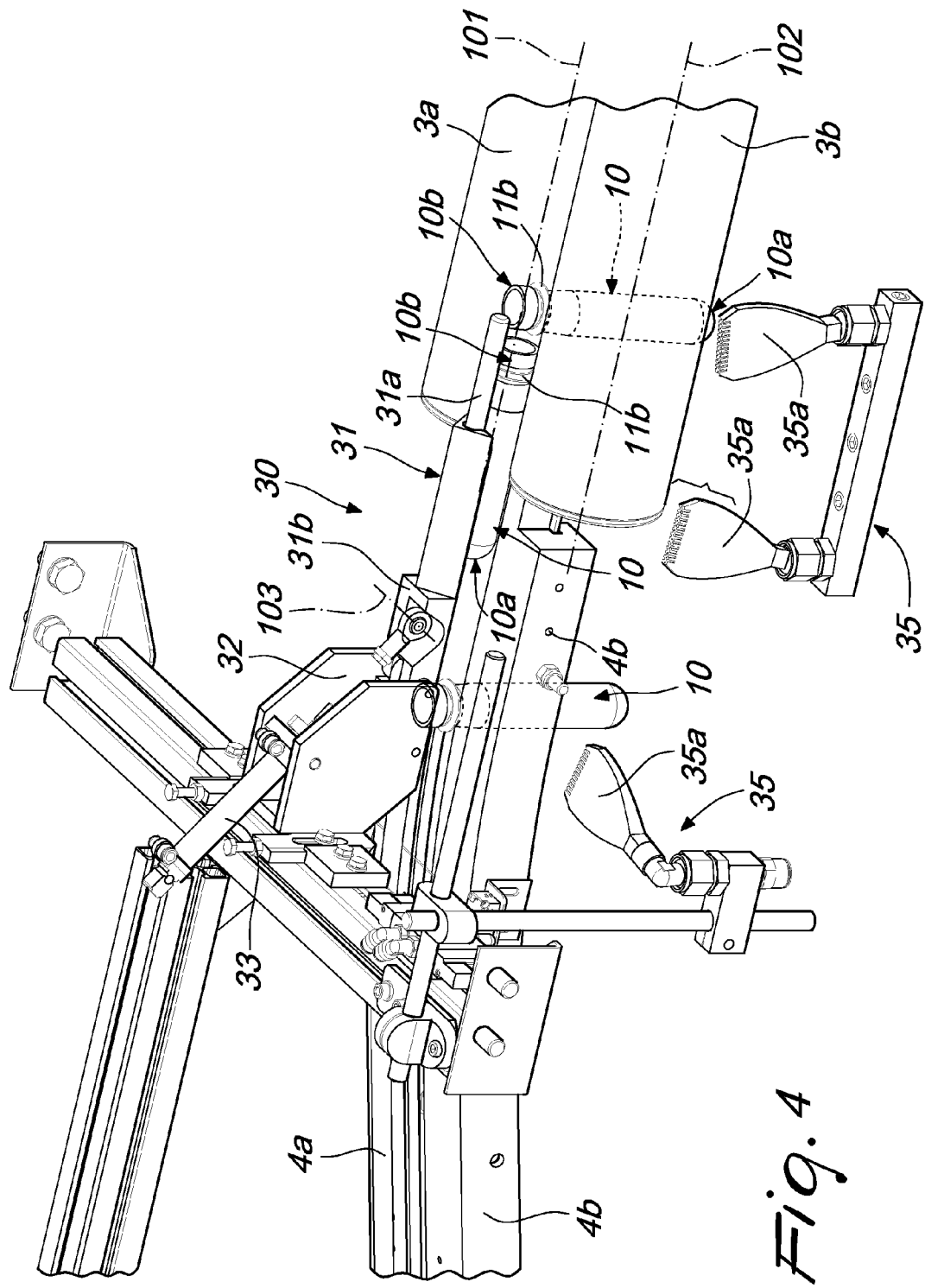
FIG. 4 is a perspective view of the region straddling the alignment rollers and the conveyance rails during a step of advancement of an incorrectly oriented preform.
Figure 5:
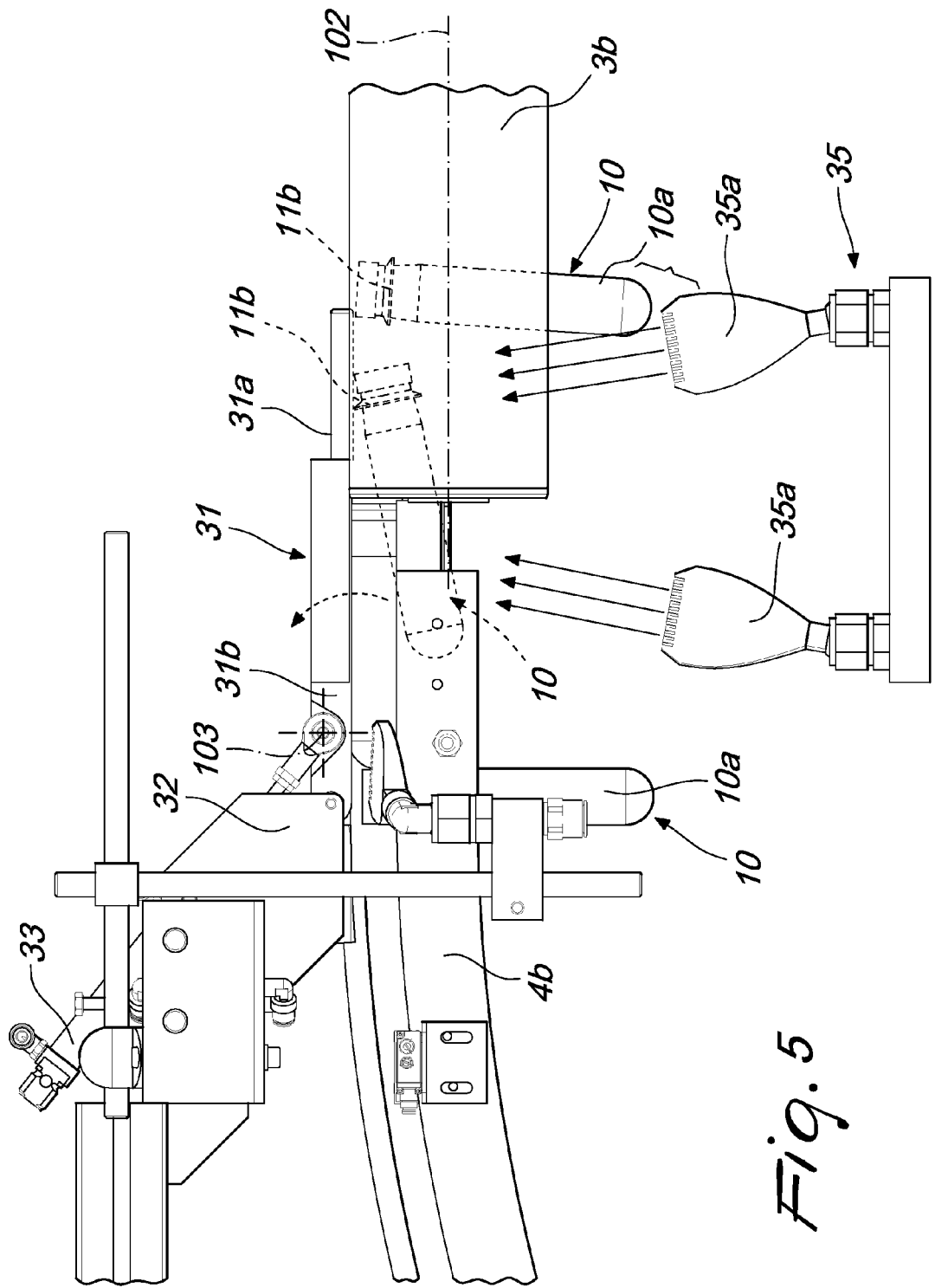
FIG. 5 is a side elevation view of the situation shown in the perspective view in FIG. 4.
Figure 6:
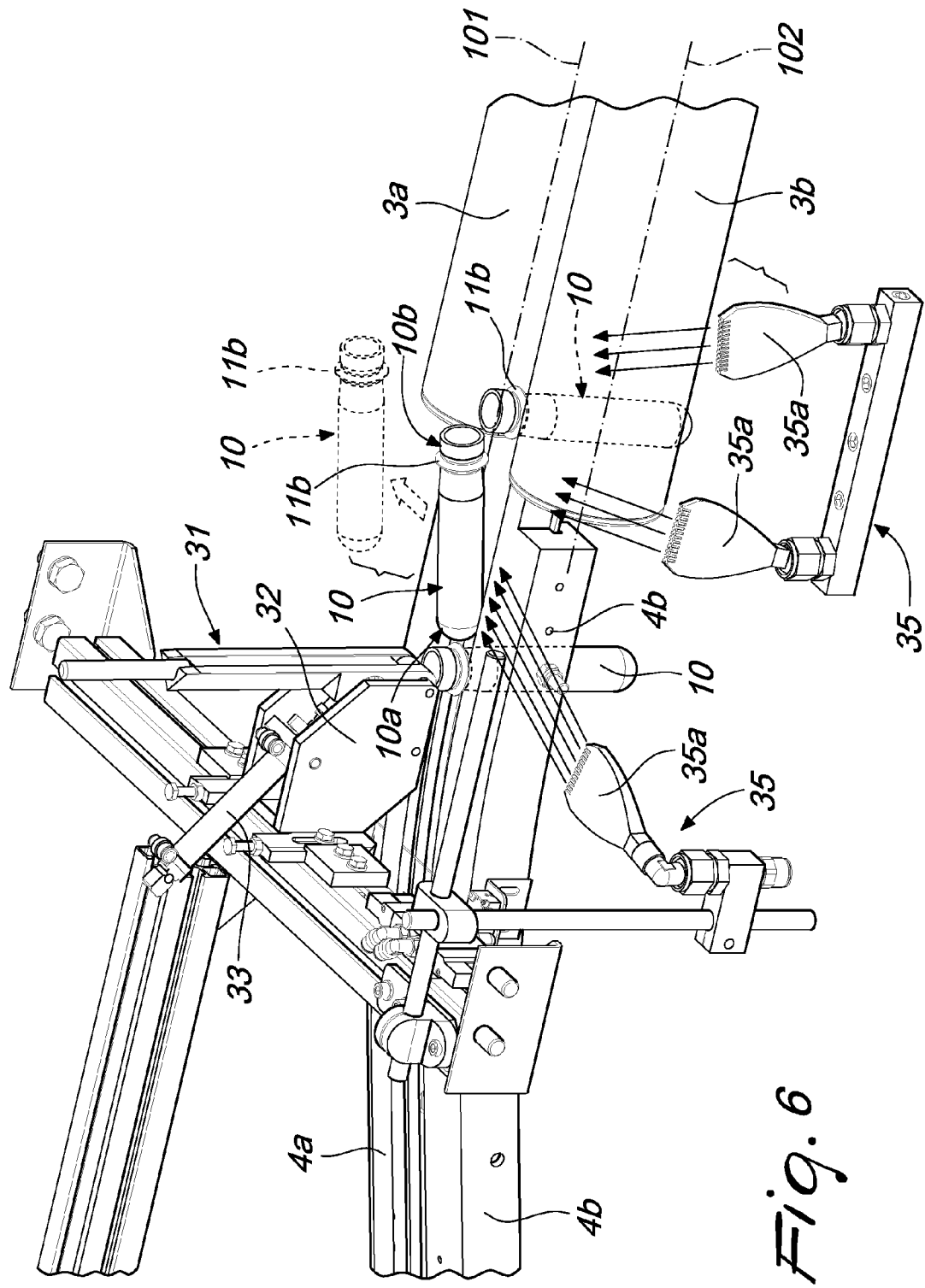
FIG. 6 is a perspective view of the region straddling the alignment rollers and the conveyance rails during a step of unloading of an incorrectly oriented preform.
Figure 7:
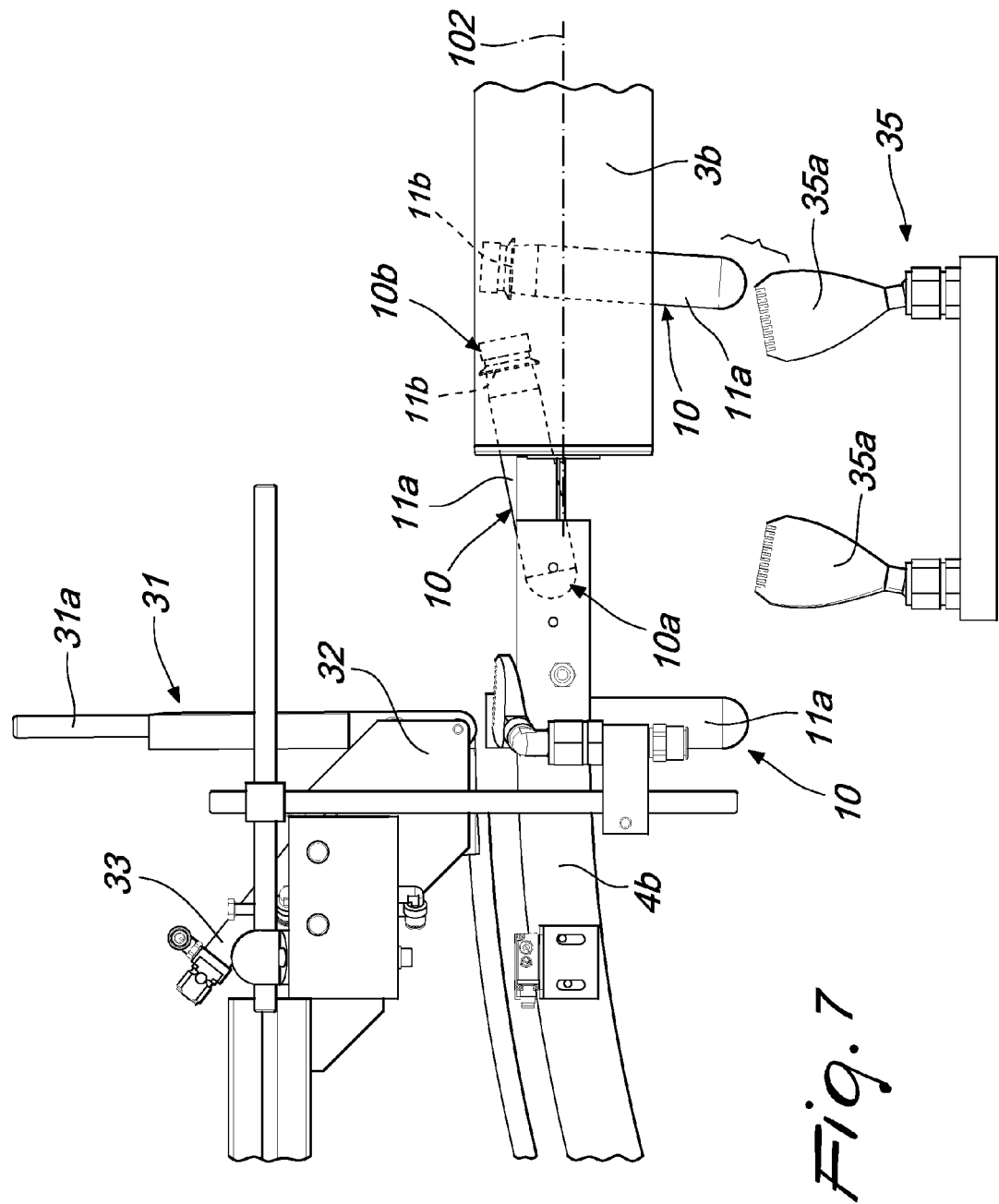
FIG. 7 is a side elevation view of the situation shown in the perspective view in FIG. 6.

The control means are, in particular, adapted to actuate the transition of the flow control portion 31a from the active blocking position (shown in FIGS. 4 and 5) to an inactive unloading position (shown in FIGS. 6 and 7) and vice versa.

In the inactive unloading position the flow control portion 31a is, in particular, spaced further apart from the alignment rollers 3a, 3b with respect to the active blocking position so as to allow the unloading of the incorrectly oriented preforms 10.

Advantageously, the unloading means 35 comprise at least one expulsion device 35a, which can be activated when the flow control portion 31a is moved to the inactive unloading position.

Preferably, the expulsion device or devices 35a are adapted to apply a thrusting action, transversely and/or vertically with respect to the longitudinal advancement direction 100, on the incorrectly oriented preform 10 in order to unload it laterally with respect to the alignment rollers 3a, 3b and/or to the conveyance tracks 4a, 4b.

Conveniently, the expulsion device 35a comprises at least one body for emitting a flow of air.

According to a preferred embodiment, the upper guide 31 extends, when the flow control portion 31a is in the active blocking position, above the region that straddles the alignment rollers 3a, 3b and the conveyance tracks 4a, 4b.

Advantageously, the upper guide 31 is hinged about a pivoting axis 103, at an interconnection portion 31b thereof, to a supporting structure 32.

In particular, the interconnection portion 31b is arranged at the other end with respect to the flow control portion 31a.

The control means comprise a device for moving the upper guide 31 about the pivoting axis 103 in order to move the flow control portion 31*a* between the active blocking position and the inactive unloading position.

Preferably, the pivoting axis 103 extends at right angles to the longitudinal extension of the upper guide 31.

The movement device comprises, for example, a linear actuator 33 which acts between the supporting structure 32 and the upper guide 31.

According to a further aspect of the disclosure, not shown in the figures, the system 1 for feeding preforms 10 to a machine 20 for blow-molding containers comprises, in sequence along a longitudinal advancement direction 100 of the preforms 10, at least one sorting and alignment device 2 which is fed with randomly arranged preforms and which comprises at least two alignment rollers 3*a*, 3*b*, which are substantially parallel and rotatable about respective axes 101, 102 and are designed to position the preforms in conveyance tracks 4*a*, 4*b*, which are inclined with respect to the horizontal, in order to feed them to the machine 20 for blow-molding containers.

The system 1 comprises means for removal of the incorrectly positioned preforms, which are individually laid flat arriving from the alignment rollers 3*a*, 3*b* on the conveyance tracks 4*a*, 4*b* and which are oriented parallel to the longitudinal advancement direction.

According to such variation, the removal means comprise at least one portion of the conveyance tracks, which extends parallel to the longitudinal advancement direction, and is rotatable on command about an axis parallel to the longitudinal advancement direction in order to pass from an active condition in which its upper edge directed toward the other conveyance track defines a support for the advancing preforms, and an inactive condition in which its edge directed toward the other conveyance track is spaced further apart from the other conveyance track so as to define an interspace which is such as to allow the fall of the incorrectly oriented preforms.

In this manner, it is possible to unload the incorrectly oriented preforms if an interruption is detected in the flow of correctly oriented preforms toward the machine for blow-molding containers.

Figure 8:
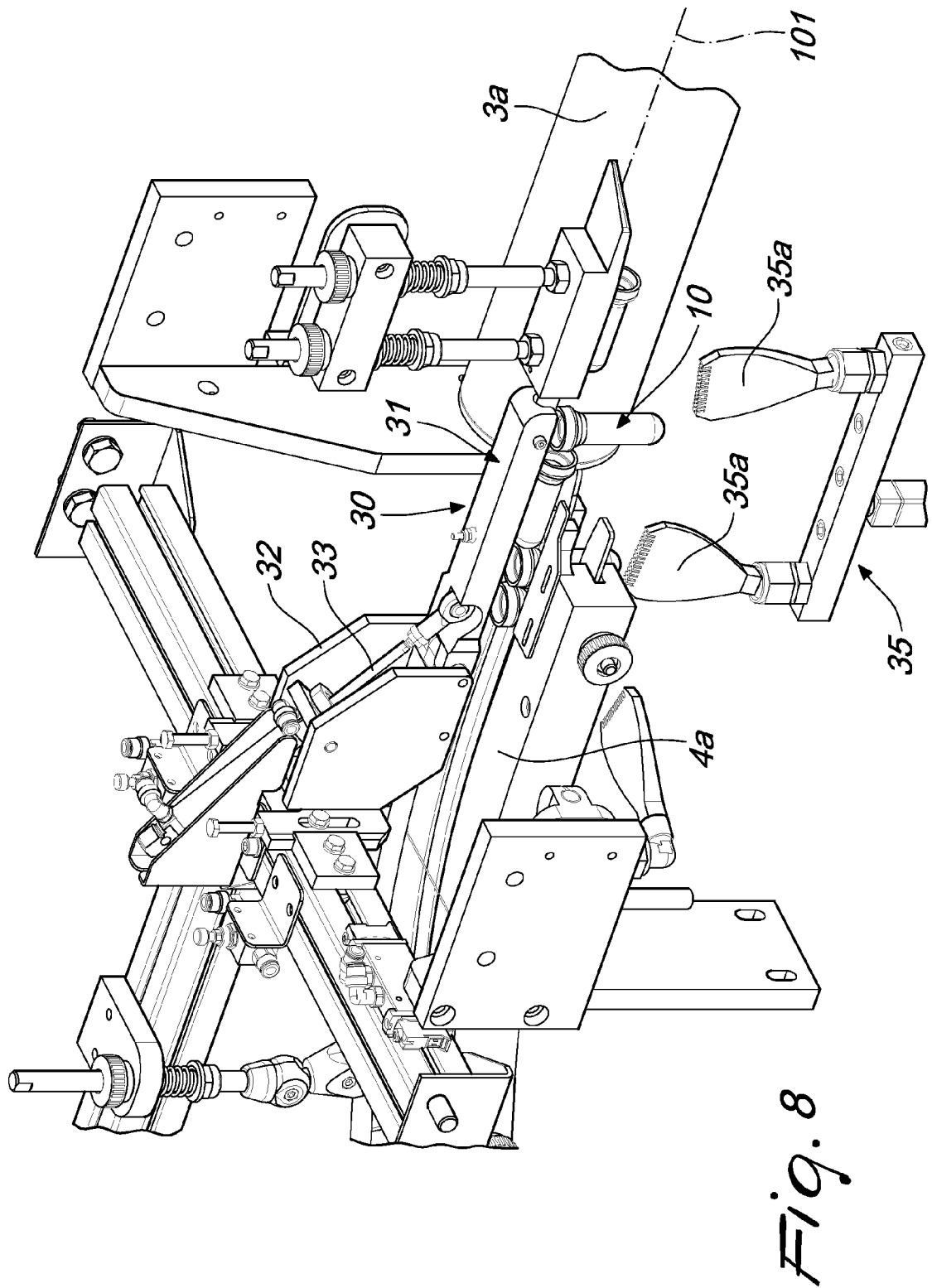
FIG. 8 is a perspective view of a variation of embodiment of the system at the region straddling the alignment rollers and the conveyance rails.
Figure 9:
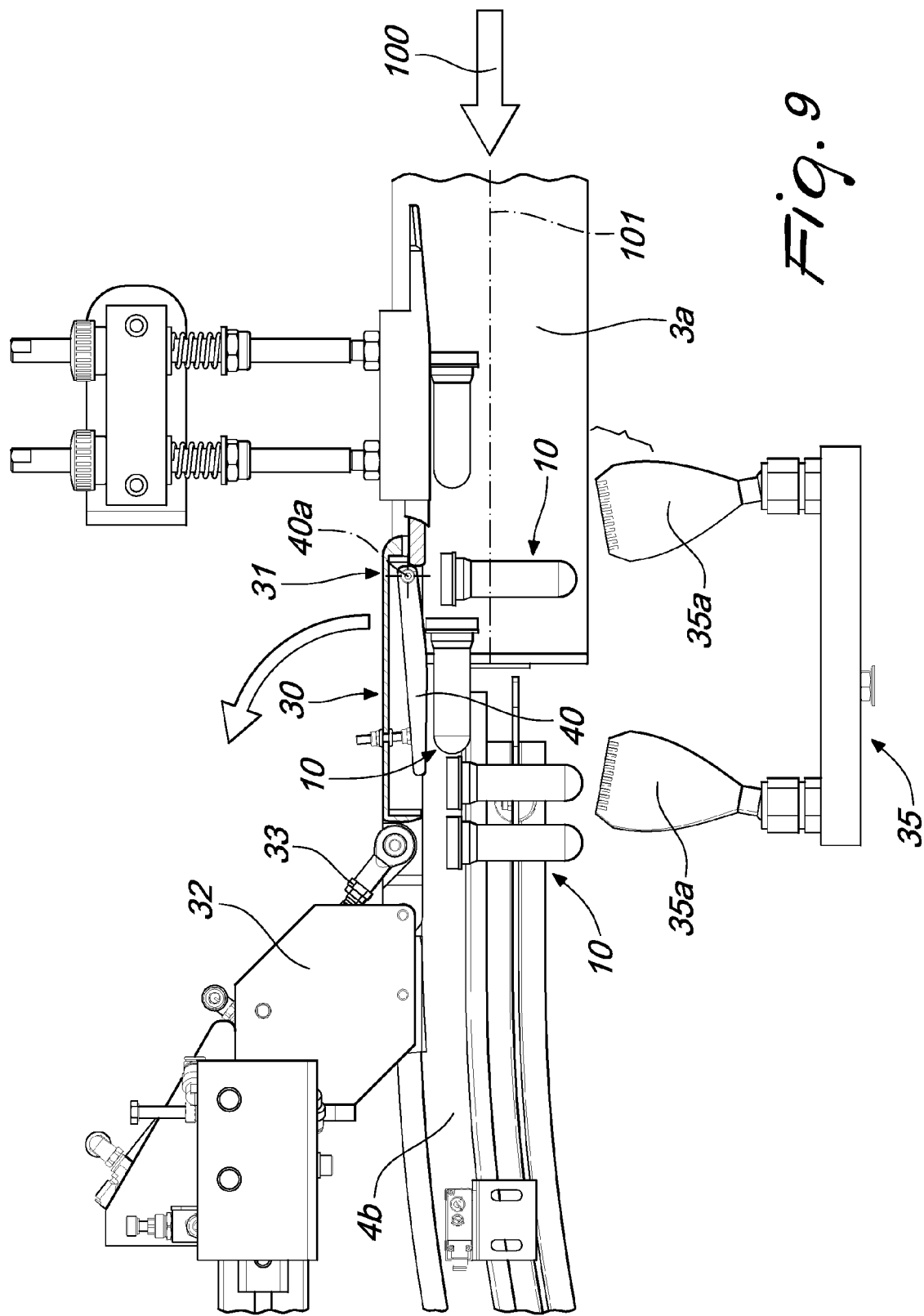
FIG. 9 is a longitudinal cross-sectional view of the variation of embodiment in FIG. 8.

With reference to the variation of embodiment shown in FIGS. 8 and 9, it is possible for the upper guide 31 to be associated with an elongated upper abutment element 40 so as to define at least partially the flow control portion 31*a*.

For the purposes of example, the elongated upper abutment element 40 can be supported so that it can rotate by the upper guide 31 about an axis 40*a* which is substantially parallel to the pivoting axis 103.

Conveniently, the axis 40*a* is arranged at the end of the upper guide 31 which is positioned, in the active blocking position, above the alignment rollers 3*a*, 3*b*.

Means, including also those of the adjustable type, of stopping the downward rotation of the elongated upper abutment element 40 act between the upper guide 31 and the elongated upper abutment element 40.

The very weight of the elongated upper abutment element 40, or if applicable the presence of means of loading which act between the elongated upper abutment element 40 and the upper guide 31, keep the upper abutment element 4*a* arranged substantially horizontally.

Similarly to the solution shown in FIGS. 1 to 7, the correctly oriented preforms 10 do not come into contact with the flow control portion 31*a* (in this case defined by the elongated upper abutment element 40) which is in the lowered (and substantially horizontal) condition by way of its weight.

In the event of the transit of an incorrectly oriented preform 10, the latter, in the passage from the alignment rollers 3*a*, 3*b* to the conveyance tracks 4*a*, 4*b*, is intercepted by the elongated upper abutment element 40 which, however, will not rotate upwardly but will remain in the lowered condition thanks to the action of its weight and to the slenderness of the thrust of the incorrectly oriented preform 10 which is already subjected to a greater friction in its advancement owing to its incorrect position.

If there is an interruption to the flow of preforms 10, caused for example by a stoppage of the blow-molding machine, the preforms 10 themselves generate a lifting thrust on the elongated abutment element 40 which will tend to rotate upwardly, allowing a sort of outlet to the preforms 10 before the flow is interrupted.

Operation of a system 1 according to the disclosure is evident from the foregoing description.

The preforms 10 are fed at random, typically by way of an elevator 6, to the sorting and alignment device 2 by positioning them at the upper end of the alignment rollers 3*a*, 3*b*.

These rollers, by rotating in opposite directions to each other, tend to orient the preforms 10 in the correct position.

Arranged along the extension of the alignment rollers 3*a*, 3*b* are conventional filtration means (typically brushes or blowers) which are designed to remove the preforms 10 arranged above those which are oriented correctly or stacked into each other, making them fall onto collection belts 8 arranged below the alignment rollers 3*a*, 3*b* which take the preforms 10 to the collection bin 7 for feeding back to the elevator 6.

When the correctly oriented preforms 10 arrive at the end of the alignment rollers 3*a*, 3*b* which is directed toward the conveyance tracks 4*a*, 4*b*, they pass below the flow control portion 31*a* in order to proceed to the conveyance tracks 4*a*, 4*b* and thence to the blow-molding machine 20.

If an incorrectly oriented preform 10, and in particular, a preform that is individually laid flat and oriented parallel to the longitudinal advancement direction 100, reaches the end of the alignment rollers 3*a*, 3*b* which is directed toward the conveyance tracks 4*a*, 4*b*, this preform, when it arrives in the region that straddles the alignment rollers 3*a*, 3*b* and the conveyance tracks 4*a*, 4*b*, inclines, more or less slightly, and this causes a contact between its end arranged upstream with respect to the longitudinal advancement direction 100 (which in the embodiment shown corresponds to the end 10*b* that defines the support flange 11*b*) and the flow control portion 31*a*, consequently blocking the preform 10.

At this point, the means for detecting the flow of preforms 10 toward the machine 20 for blow-molding containers detects an interruption in the flow, and command the movement device.

The movement device, which is for example constituted by a linear actuator 33, moves the upper guide 31 about the pivoting axis 103 so that the flow control portion 31*a* can be moved from the active blocking position to the inactive unloading position.

At this point, the means of expulsion are activated which laterally unload the incorrectly oriented preform (and optionally those arranged immediately upstream) and, immediately after, the flow control portion 31*a* is returned to the active blocking position.

It is possible to interrupt the rotation of the alignment rollers 3a, 3b about the respective axes 101, 102 during the unloading operations.

The individual characteristics set out in reference to general teachings or to specific embodiments may all be present in other embodiments or may substitute characteristics in such embodiments.

The disclosure, thus conceived, is susceptible of numerous modifications and variations.

In practice the materials employed, provided they are compatible with the specific use, and the dimensions and shapes, may be any according to requirements.

Moreover, all the details may be substituted by other, technically equivalent elements.

The invention claimed is:

1. A system for feeding preforms to a container blow-molding machine, which comprises, in sequence along a longitudinal advancement direction of the preforms, at least one sorting and alignment device which is fed with randomly arranged preforms and comprises at least two alignment rollers which are substantially parallel, can rotate about their respective axes and are intended to arrange the preforms in conveyance tracks which are inclined with respect to a horizontal axis, in order to feed them to the blow-molding machine, said system comprising means for removing the incorrectly positioned preforms, which are individually laid flat and arrive from the alignment rollers on the conveyance tracks and are oriented parallel to said longitudinal advancement direction, wherein said removal means comprise an upper guide which has at least one flow control portion which is arranged, at least in one active blocking position thereof, above the end of said alignment rollers which is proximate to said conveyance tracks at a distance from said alignment rollers which is such as to allow the passage below said flow control portion of the correctly oriented preforms and block the longitudinal end, which is arranged upstream with respect to the longitudinal advancement direction, of said incorrectly oriented preforms when said incorrectly oriented preforms straddle said alignment rollers and said conveyance tracks, said removal means comprising means for unloading said incorrectly oriented preforms which are blocked by said flow control portion, further comprising control means which are associated functionally with means for detecting the flow of preforms toward said container blow-molding machine, said control means being adapted to actuate the transition of said flow control portion from said active blocking position to an inactive unloading position, in which said flow control portion is spaced further apart from said alignment rollers with respect to the active blocking position in order to allow the unloading of the incorrectly oriented preforms.

2. The system according to claim 1, wherein said flow control portion extends parallel to said longitudinal advancement direction.

3. The system according to claim 1, wherein said upper guide extends, when said flow control portion is in the active blocking position, above the region that straddles said alignment rollers and said conveyance tracks.

4. A system for feeding preforms to a container blow-molding machine, which comprises, in sequence along a longitudinal advancement direction of the preforms, at least one sorting and alignment device which is fed with randomly arranged preforms and comprises at least two alignment rollers which are substantially parallel, can rotate about their respective axes and are intended to arrange the preforms in conveyance tracks which are inclined with respect to a horizontal axis, in order to feed them to the blow-molding machine, said system comprising means for removing the incorrectly positioned preforms, which are individually laid flat and arrive from the alignment rollers on the conveyance tracks and are oriented parallel to said longitudinal advancement direction, wherein said removal means comprise an upper guide which has at least one flow control portion which is arranged, at least in one active blocking position thereof, above the end of said alignment rollers which is proximate to said conveyance tracks at a distance from said alignment rollers which is such as to allow the passage below said flow control portion of the correctly oriented preforms and block the longitudinal end, which is arranged upstream with respect to the longitudinal advancement direction, of said incorrectly oriented preforms when said incorrectly oriented preforms straddle said alignment rollers and said conveyance tracks, said removal means comprising means for unloading said incorrectly oriented preforms which are blocked by said flow control portion, wherein said unloading means comprise at least one expulsion device which can be activated when said flow control portion is moved to said inactive unloading position.

5. The system according to claim 4, wherein said at least one expulsion device is adapted to apply a thrusting action transversely to the longitudinal advancement direction on said preform in order to unload said preform laterally with respect to said alignment rollers and said conveyance tracks.

6. The system according to claim 4, wherein said at least one expulsion device is adapted to apply thrusting action in a vertical direction on said preform in order to unload said preform laterally with respect to said alignment rollers and said conveyance tracks.

7. The system according to claim 4, wherein said at least one expulsion device comprises at least one body for emitting a flow of air.

8. A system for feeding preforms to a container blow-molding machine, which comprises, in sequence along a longitudinal advancement direction of the preforms, at least one sorting and alignment device which is fed with randomly arranged preforms and comprises at least two alignment rollers which are substantially parallel, can rotate about their respective axes and are intended to arrange the preforms in conveyance tracks which are inclined with respect to a horizontal axis, in order to feed them to the blow-molding machine, said system comprising means for removing the incorrectly positioned preforms, which are individually laid flat and arrive from the alignment rollers on the conveyance tracks and are oriented parallel to said longitudinal advancement direction, wherein said removal means comprise an upper guide which has at least one flow control portion which is arranged, at least in one active blocking position thereof, above the end of said alignment rollers which is proximate to said conveyance tracks at a distance from said alignment rollers which is such as to allow the passage below said flow control portion of the correctly oriented preforms and block the longitudinal end, which is arranged upstream with respect to the longitudinal advancement direction, of said incorrectly oriented preforms when said incorrectly oriented preforms straddle said alignment rollers and said conveyance tracks, said removal means comprising means for unloading said incorrectly oriented preforms which are blocked by said flow control portion, wherein said upper guide is hinged about a pivoting axis, at an interconnection portion thereof, to a supporting structure, said control means comprising a device for moving said upper guide about said pivoting axis in order to move said flow control portion between said blocking condition and said unloading condition and vice versa.

9. The system according to claim 8, wherein said pivoting axis extends at right angles to the longitudinal extension of said upper guide.

10. The system according to claim 8, wherein said movement device comprises a linear actuator which acts between said supporting structure and said upper guide.

11. The system according to claim 8, wherein said upper guide is associated with an elongated upper abutment element so as to define at least partially said flow control portion, said elongated upper abutment element being supported so that it can rotate by said upper guide about an axis which is substantially parallel to the pivoting axis.

12. The system according to claim 11, wherein said axis is arranged at the end of said upper guide which is positioned, in the active blocking position, above the alignment rollers, means of stopping the downward rotation of said elongated upper abutment element acting between the upper guide and said elongated upper abutment element.

* * * * *